A. A. KRAMER.
CONVERTIBLE VEHICLE BODY.
APPLICATION FILED FEB. 5, 1921.
1,425,596.
Patented Aug. 15, 1922.
2 SHEETS—SHEET 1.
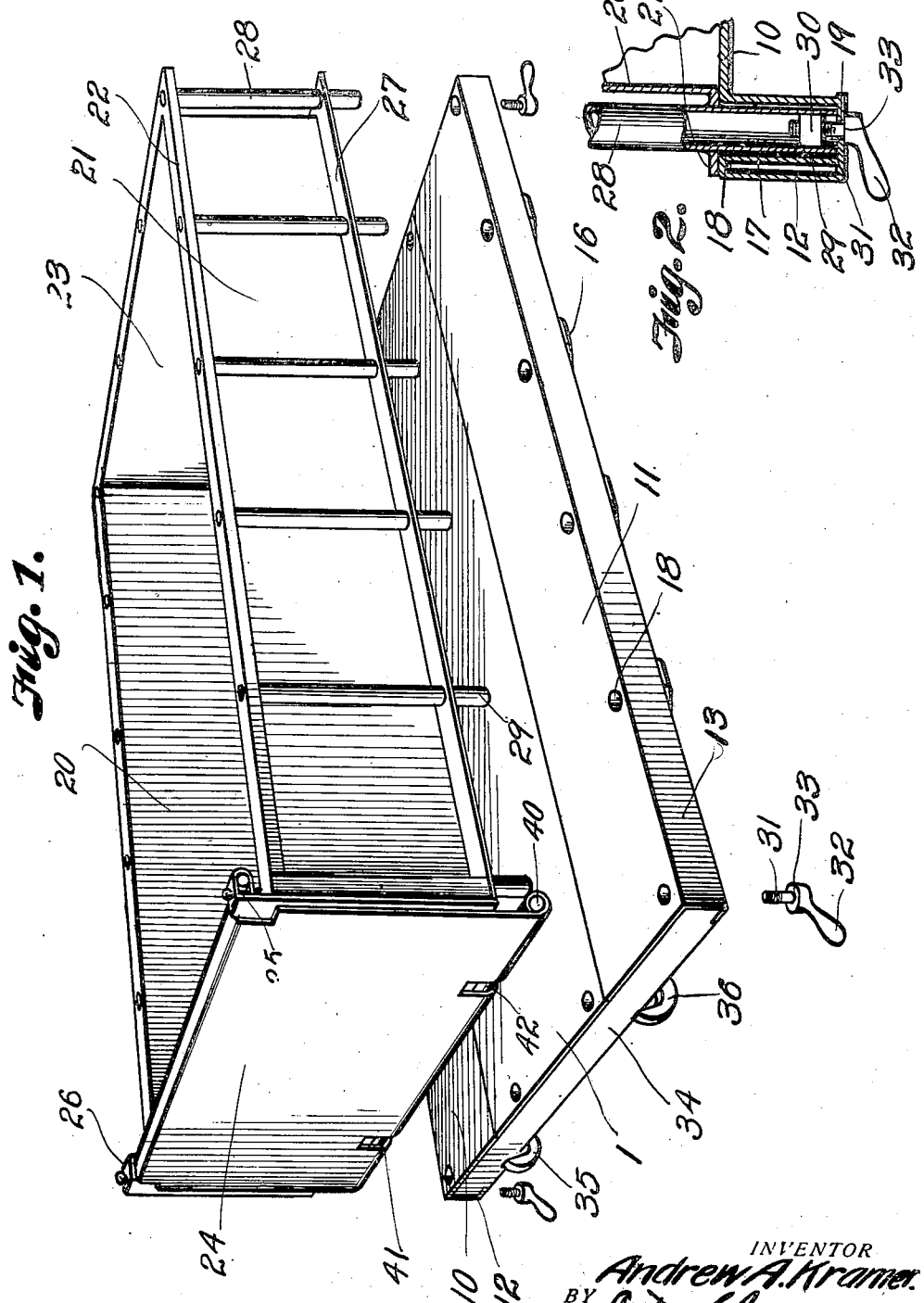
INVENTOR
Andrew A. Kramer.
BY
ATTORNEY

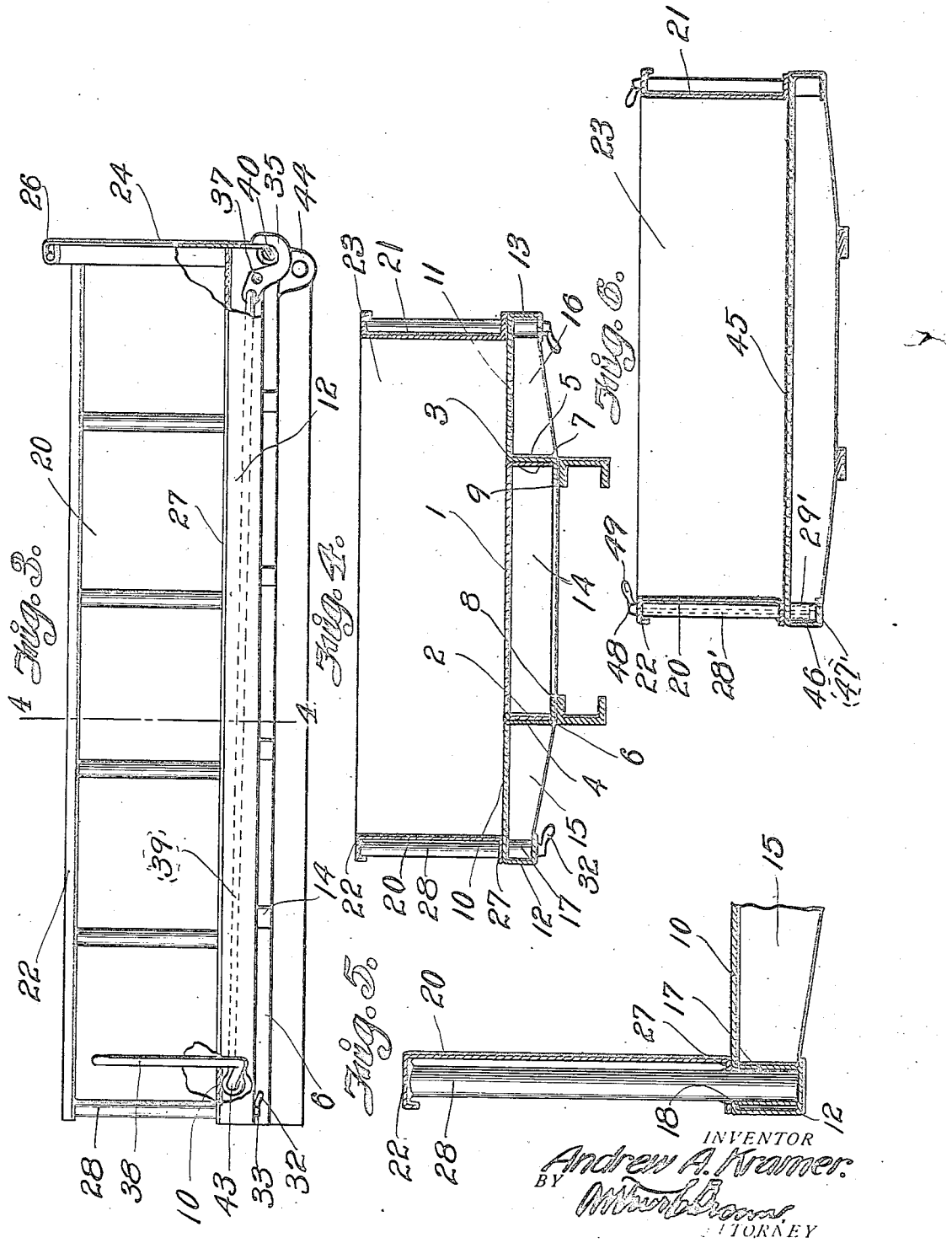

UNITED STATES PATENT OFFICE.

ANDREW A. KRAMER, OF KANSAS CITY, MISSOURI.

CONVERTIBLE VEHICLE BODY.

1,425,596.  Specification of Letters Patent.  Patented Aug. 15, 1922.

Application filed February 5, 1921. Serial No. 442,698.

*To all whom it may concern:*

Be it known that I, ANDREW A. KRAMER, a citizen of the United States, residing at Kansas City, in the county of Jackson and State of Missouri, have invented certain new and useful Improvements in Convertible Vehicle Bodies; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to vehicle bodies and particularly to a convertible body adapted to be used as a truck or platform body, an express body, a dump body, or a stake body; that is, the invention is capable of being utilized as a straight platform body, as a body closed at the sides and ends, or stakes may be substituted for the sides and ends, the enclosed body being also adapted to be swung upon pivots whereby the body may be dumped.

It is one of the purposes of my invention to construct the body of steel so that it will be strong, durable and efficient.

In the drawings,

Fig. 1 is a perspective view of a platform body, showing the removable sides and ends ready to be applied thereto to convert the same into an express body.

Fig. 2 is a sectional view through the dowel or stake-receiving sockets of the platform portion.

Fig. 3 is a side elevational view, partly in section, of the device converted into a dump body.

Fig. 4 is a vertical, sectional view on the line 4—4 of Fig. 3.

Fig. 5 is a detail sectional view of a portion of the platform member and a part of the stake side, and Fig. 6 is a vertical, longitudinal, sectional view through a slightly modified form of fastening means.

The platform is shown as comprising a bed which may be conveniently constructed of a center channel and two side angle members of substantially Z-shaped form. The central member consists of a floor plate section 1, having depending flanges 2 and 3 parallel with and abutting against the vertical flanges 4 and 5 of the side members 6 and 7. The side members of the platform are substantially Z-beam shaped; that is, the members are provided with the vertical webs 4 and 5, the inwardly projecting flanges 8 and 9 and outwardly projecting floor sheet members 10 and 11 terminating in downwardly and inwardly bent flanged portions 12 and 13 respectively, the portions 12 and 13 in themselves constituting channels to support socket members, as will be presently explained.

The depending flanges 2 and 3 of the central member 1 rest upon the inbent flanges 8 and 9 of the Z-beam side members 6 and 7, the respective members being welded together to form a continuous bed or sheet, reinforced by transverse sills or transoms 14 aligning with end members 15 and 16.

The flange ends or channels 12 and 13 at convenient points carry tubular sleeves or sockets 17, which are welded therein and which align with openings 18 in the platform aligning with openings 19 in the bottoms of the channels 12 and 13, as will be apparent by Fig. 2.

The removable express portion of the body is shown as consisting of vertical side plates 20 and 21, flanged-over, as at 22 and connected at their front ends by a front channel 23, the rear ends being connected by a hinged end gate 24 on the pivots 25 and 26 so as to normally close the rear end of the receptacle or express portion formed by the sides 20, 21 and 23. The sides 20 and 21 also have lower flanges 27 to which are secured spaced hollow dowels or tubes 28, fastened to the respective flanges and extending below the side walls to form dowel portions 29, receivable within the openings 18 and within the tubular portions or sockets 17, the portions 29 constituting stakes to fasten the sides and ends to the platform. The lower portions of the dowels or stake portions 29 have welded therein nuts 30, which are adapted to be engaged by the winged bolts 31 having the wings or handles 32, as indicated in Fig. 2, to engage the same whereby the dowels or stake portions 29 may be rigidly fastened to the side members 6 and 7, the shoulders 33 bearing against the under side of the flanged members 12 and 13 and the threaded portions engaging the nuts, as will be clearly apparent by reference to Fig. 2.

The ends of the platform are provided with continuous end sills 34 (see Fig. 1).

When the device is used as a truck, the platform will serve the purpose of supporting the load. When the vehicle is to be converted into an express vehicle, the sides and ends, as shown in Fig. 1, will be fastened to the platform by introducing the projecting portions or stakes 29 into the openings 18 and then securing the same through the medium of the fastening devices consisting of the bolts 31 and their wings or lever portions 32. The end gate may be held in position by means of the hooked portions 35 and 36, which are pivoted to the rear of the platform, as at 37, and which are connected to an actuating lever 38 at the forward portion of the vehicle through the longitudinal links 39, there being a cam action between the lever 38 and links 39 so that when the hooks 35 and 36 engage the transverse rod 40 through the slotted portions 41 and 42, the cam 43 will hold the hooks in locked engagement but when the lever is swung in an opposite direction, the hooks will be released.

It is obvious that the platform may be pivoted to the chassis through the medium of the depending ears 44 so that the vehicle may be converted into a dumping vehicle, any suitable hoist being provided to raise the forward end thereof.

In Fig. 6 I have shown a slightly modified form of platform 45, in which socket members 46 are provided, the stakes or tubes 28' being receivable therein in the same manner that the tubes 28 with their stake ends 29 are received in the form shown in Fig. 1. In the form shown in Fig. 6, however, the bolt extends upwardly from a nut or base 47 through the top of the tube and through the upper flange of the side walls, being fastened by a fastening device consisting of a nut 48 and a wing 49.

It will be apparent from the foregoing that the device may initially be used as a platform wagon or vehicle, that the same may be readily converted into an express vehicle, that a stake body may be provided by using the skeleton frame or stakes 28 and ends 29 without the continuous sides and ends or that the device may be converted into a dumping vehicle if desired.

The advantage of such a construction is that a vehicle, particularly of the motor truck type, may have a greater range of utility and usefulness than the ordinary construction of vehicle now available.

It will also be apparent that the device is strong and durable and that it may be readily constructed of sheet metal except for the stakes, which may be of commercial tubing.

What I claim and desire to secure by Letters-Patent is:

1. In a vehicle, a platform comprising a center plate having depending flanges, side plates connected to the center plate, each having an inner depending flange with a laterally projecting flange on the edge thereof, the depending flange of each side plate and a depending flange of the center plate lying one against the other, depending flanges on the side plates having inturned edges, tubular socket members interposed between the inturned edges of the depending flanges on the side plates and the lower faces of the side plates, said tubular sockets having openings aligning with openings in the side plates whereby stake pockets are formed, and means for fastening the tubular socket members to the side plates.

2. In a vehicle, a platform comprising a center plate having depending flanges, side plates connected to the center plate, each having an inner depending flange with a laterally projecting flange on the edge thereof, the depending flange of each side plate and a depending flange of the center plate lying one against the other, depending flanges on the side plates having inturned edges, tubular socket members interposed between the inturned edges of the depending flanges on the side plates and the lower faces of the side plates, said tubular sockets having openings aligning with openings in the side plates whereby stake pockets are formed, means for fastening the tubular socket members to the side plates, and removable stakes receivable in the socket members.

3. In a vehicle, a platform comprising a center plate having depending flanges, side plates connected to the center plate, each having an inner depending flange with a laterally projecting flange on the edge thereof, the depending flange of each side plate and a depending flange of the center plate lying one against the other, depending flanges on the side plates having inturned edges, tubular socket members interposed between the inturned edges of the depending flanges on the side plates and the lower faces of the side plates, said tubular sockets having openings aligning with openings in the side plates whereby stake pockets are formed, means for fastening the tubular socket members to the side plates, a removable body portion consisting of connected side members having tubular depending dowels receivable in the socket members, and means for fastening the dowels within the socket members, said means comprising threaded nuts within the tubular dowels and a threaded clamp having a head, one end of which bears against the inturned edge of one of the flanges on the side plates and having threaded means for engaging the nuts.

4. A vehicle body comprising two members, one of which is a base and the other a vertical wall, stake-receiving sockets integral with the base, the openings of which are vertical, stakes carried by the wall and engaging the socket openings, nuts rigidly secured within the lower ends of the stakes, and an externally threaded locking means for each stake having a shoulder bearing against the end of the socket and engaging the nut in the stake which the locking means is to secure.

5. A vehicle body comprising a base having integral side flanges bent under the base to form socket floors, the base having openings in line with the bent-under portions of the flanges to receive stakes, a vertical wall structure having tubular stakes rigid therewith receivable in the openings and having their bottom portions resting upon the flanges, internally threaded members in the stakes, and externally threaded members bearing against the bottom of the flanges and engaging the internally threaded members in the stakes.

In testimony whereof I affix my signature.

ANDREW A. KRAMER.